(12) United States Patent
Sisman et al.

(10) Patent No.: US 12,378,710 B2
(45) Date of Patent: Aug. 5, 2025

(54) MULTI-LAYER INTERLINING AND THE PRODUCTION PROCESS THEREOF

(71) Applicant: TELASIS TEKSTIL URUNLERI SAN. VE TIC. A. S, Istanbul (TR)

(72) Inventors: Ali Zafer Sisman, Istanbul (TR); Almila Cerci Izmit, Istanbul (TR); Zeynep Kaya, Istanbul (TR); Tamer Safak, Istanbul (TR)

( * ) Notice: Subject to any disclaimer, the term of this patent is extended or adjusted under 35 U.S.C. 154(b) by 260 days.

(21) Appl. No.: 18/001,886

(22) PCT Filed: Aug. 25, 2021

(86) PCT No.: PCT/TR2021/050856
§ 371 (c)(1),
(2) Date: Dec. 15, 2022

(87) PCT Pub. No.: WO2022/125022
PCT Pub. Date: Jun. 16, 2022

(65) Prior Publication Data
US 2023/0228016 A1    Jul. 20, 2023

(30) Foreign Application Priority Data
Dec. 8, 2020 (TR) .............. TR2020/19976

(51) Int. Cl.
*B32B 5/02* (2006.01)
*B32B 5/26* (2006.01)
(Continued)

(52) U.S. Cl.
CPC ............. *D04H 1/559* (2013.01); *B32B 5/022* (2013.01); *B32B 5/266* (2021.05); *B32B 7/10* (2013.01);
(Continued)

(58) Field of Classification Search
CPC ............ B32B 2309/02; B32B 2305/28; B32B 2305/20; B32B 2250/02; B32B 2262/124;
(Continued)

(56) References Cited

U.S. PATENT DOCUMENTS

| 5,614,281 A | 3/1997 | Jackson et al. |
| 2005/0148260 A1* | 7/2005 | Kopacz .................. B08B 1/143 |
| | | 442/381 |

(Continued)

FOREIGN PATENT DOCUMENTS

| EP | 2671991 B1 | 4/2015 |
| EP | 2862708 A1 | 4/2015 |

(Continued)

OTHER PUBLICATIONS

International Search Report for corresponding PCT/TR2021/050856, dated Nov. 11, 2021.
(Continued)

*Primary Examiner* — Vishal I Patel
(74) *Attorney, Agent, or Firm* — Egbert, McDaniel & Swartz, PLLC

(57) ABSTRACT

Disclosed is a new multi-layer nonwoven interlining and the production process thereof. The process allows a multi-layer nonwoven interlining to be obtained simultaneously with a single process on a single production line. The process includes a fiber opening step, a fiber feeding step, a carding step, a levelling step of the additional layer by the thermal treatment, and a point bonding step of the carded web and additional layer. As a result of the process, a structure is obtained where the carded web is point-bonded onto the additional layer.

10 Claims, 2 Drawing Sheets

(51) Int. Cl.
*B32B 7/10* (2006.01)
*B32B 37/00* (2006.01)
*B32B 37/04* (2006.01)
*B32B 38/00* (2006.01)
*B32B 38/06* (2006.01)
*D04H 1/558* (2012.01)
*D04H 1/559* (2012.01)

(52) U.S. Cl.
CPC .......... *B32B 37/0084* (2013.01); *B32B 37/04* (2013.01); *B32B 38/0004* (2013.01); *B32B 38/0036* (2013.01); *B32B 38/06* (2013.01); *D04H 1/558* (2013.01); *B32B 2250/02* (2013.01); *B32B 2262/124* (2021.05); *B32B 2305/20* (2013.01); *B32B 2305/28* (2013.01); *B32B 2309/02* (2013.01)

(58) Field of Classification Search
CPC . B32B 38/06; B32B 38/0036; B32B 38/0004; B32B 37/04; B32B 37/0084; B32B 7/10; B32B 5/022; B32B 5/266; D04H 1/558; D04H 1/559
See application file for complete search history.

(56) References Cited

U.S. PATENT DOCUMENTS

2014/0120322 A1\* 5/2014 Fu ...................... D04H 1/43912
   428/176
2014/0170367 A1\* 6/2014 Turner .............. A61F 13/15707
   428/91

FOREIGN PATENT DOCUMENTS

| JP | 2018050977 A | 4/2018 | |
| WO | 1997024482 A1 | 7/1997 | |
| WO | 2006011724 A1 | 2/2006 | |
| WO | 2006071211 A1 | 7/2006 | |
| WO | WO-2012006300 A1 \* | 1/2012 | ............. A61F 13/15 |
| WO | WO-2018060885 A1 \* | 4/2018 | ......... A44B 18/0011 |

OTHER PUBLICATIONS

Written Opinion of the International Searching Authority for corresponding PCT/TR2021/050856, dated Nov. 11, 2021.

\* cited by examiner

MULTI-LAYER INTERLINING AND THE PRODUCTION PROCESS THEREOF

SUBJECT OF THE INVENTION AND TECHNICAL FIELD

The invention relates to a new multi-layer nonwoven interlining and the production process thereof. In particular, the invention also relates to a product and a process that allows a multi-layer nonwoven interlining to be obtained simultaneously with a single process on a single production line, without the need for a second joining process.

STATE OF THE ART

The interlining is an auxiliary material that is attached to the fabric by the different methods to achieve the effect and appearance expected from the cloth. It has been used since the 1950s and is quite common in the textile industry. Some of the usage areas of the interlining in the textile industry are to prevent stretching and wrinkling in the part where the fabric is applied, to ensure that the fabric maintains its desired shape, to provide toughness to the fabric, and to be a support element in various regions (such as collar, cuff, pocket, pocket flap). The interlining types can be classified in different types such as nonwoven interlinings, adhesive interlinings, woven interlinings, knitted interlinings, etc.

The interlinings which are especially generated from the natural fibers or manmade fibers are produced by the nonwoven technique today. The nonwovens (nonwoven surfaces) are the structures formed as a result of bonding the fibers of a single type or of a mixture to each other through heat and pressure. The fibers can be natural, synthetic or a mixture. The nonwoven interlinings are generated by covering the surface with various adhesives and various methods, which is formed by bonding the natural, synthetic or endless (filament) fibers that are not converted into yarn to each other by some specific methods.

In the interlinings produced in the nonwoven technique, the bonding of the fibers can be achieved by mechanical techniques (needling, water jetting, sewing, etc.) or chemical methods (impregnation, spraying, powdering, foaming, etc.) as well as by using heat. In the joining by using heat, the hot cylinders, apertured cylinders, sound waves, hot air, radiation, etc. can be utilized. The thermal bonding is a thermal web bonding process performed under heat and point (local) pressure. By this technique, it is possible to make different patterns according to the design of the apertured cylinder at the local bonding areas. According to the pattern type, there are three different methods as area bonding, point bonding and embossing type. The heat, pressure, passing speed, cylinder pattern and location of the cooling cylinders are all important factors. By the thermal bonding technique, very robust webs can be obtained depending on the pattern type.

In the local bonding system, any place where the bonding can be done on the nonwoven interlining is treated. Each fiber or filament is interlocked with the other. The treatment is generally applied with the effect of heat and pressure in the form of hot air and steam. This bonding makes the touching more rigid than the point bonding. A paper-like character is observed in the resulting products. In the point bonding system, the filaments or fibers are joined by a kind of centering in small areas. (The centering process is a mechanical texturing technique that allows the filaments to cling to each other by adding entanglement with compressed air to the filament untextured or previously textured with the thermomechanical texturing methods yarn.) This bonding is carried out with the auxiliary elements such as heat, pressure, adhesives. The point bonding is superficially carried out in the areas of the muslin, which are determined by the design of the cylinder that will perform the bonding. Therefore, the fabric obtained is softer to the touch, flexible and air permeable.

In the state of the art, the patent studies have been encountered on the nonwovens and especially on the use of nonwovens in the fastener interlining. The fastener structures, called hook and loop fasteners (velcro), consist of two linear strips. In the first strip, there is a small hook structure, and in the second strip, there is a smaller loop structure. When two strips are overlapped and pressed, the hook structure sticks to the loop and the closure occurs. When two strips are separated from each other, a distinctive separation sound occurs.

In the state of the art, there is a European Patent no. EP2862708A1 titled "Loop-forming closure element for Velcro elements and method for producing a closure element". In the European Patent no. EP2862708A1, a closure element and a method for producing the same are described. In said patent, the structure obtained as a result of the process of the invention consists of a spunbond nonwoven web formed from a carded fiber mixture of the interlaced staple and continuous fibers, and a film layer laminated with said web by means of an adhesive. Said nonwoven web has embossments on one side. In the European Patent no. EP2862708A1, the bonding processes are carried out by embossing and water spraying.

A study in the state of the art is the International Patent no. WO2006011724A1 titled "Nonwoven loop sheet and method for manufacturing the same". Said patent describes a nonwoven loop (ring, knot, fringed structure) layer to be used for disposable baby diapers, various products or clothing. The International Patent no. WO2006011724A1 describes that when the loop layer has a high fiber density, the hook binds poorly to the band, and as a solution, the subject of the patent is a structure in which the fiber density of one surface of the nonwoven layer is reduced, and the production method of this structure. With the structure of the invention, the pile loss that will occur in case of the repeated separation of the hook and loop layers is prevented and the fastening strength is increased. It is also advantageous in terms of cost.

Another study in the state of the art is the U.S. Pat. No. 5,614,281A titled "Creped nonwoven laminate loop fastening material for mechanical fastening systems". In the U.S. Pat. No. 5,614,281A, a craped nonwoven loop (ring, knot, fringed structure) material is described. In said patent, the production is generally carried out by joining a nonwoven layer and a support layer by means of the hot rollers. In the U.S. Pat. No. 5,614,281A, the original point of the invention is a craped structure, thus it is stated that it has a soft and aesthetically appealing appearance. It is also advantageous in terms of strength and cheapness.

In the state of the art, it has been observed that the studies on the multi-layer nonwoven interlinings, especially the studies on the fasteners for the hygiene and medical sector, are mostly aimed at increasing the strength. In this context, there is a search for a product with the superior strength properties and a process that will provide this product. The improvements are necessary in the production process of the multi-layer nonwoven interlinings, especially it is important that the production can be simultaneously carried out with a single process that can proceed in a single production line.

Technical Problems to be Solved by the Invention

In the state of the art, the object of the invention is to provide a multi-layer nonwoven interlining product and a production process for the multi-layer nonwoven interlining, which allows the process in which the produced layers are joined with a hot, embossing calender by a second joining process to be carried out simultaneously and in a single step.

The most important advantage of the process of the invention is that it allows the production of the multi-layer nonwoven interlining with a single process on a single production line simultaneously. Thus, the costs such as purchasing costs, inventory costs, costs for combining with a second process, labor costs are eliminated. It also provides a solution to the difficulty of ensuring quality and continuity in procurement through purchasing.

Another advantage of the process of the invention is that it is a process that allows the use of many different fiber types in many combinations. The web designed in many different fibers and mixtures can be produced in different weights.

Another advantage of the process of the invention is that it comprises the levelling of the additional layer by the thermal treatment. The levelling by the thermal treatment provides additional strength values to the multi-layer nonwoven interlining of the invention and increases the performance of the product.

Another advantage of the process of the invention is that there is no need for a meltblown layer. In the state of the art, the web is in the form of Spunbond-Meltblown-Spunbond (SMS). With the levelling by the thermal treatment, the higher strength values can be obtained in the multi-layer nonwoven interlining of the invention at lower weights. Thus, there is no need for a meltblown layer which does not provide an advantage in terms of strength. By not using the meltblown layer, an advantage is provided in terms of cost.

In the process of the invention, the natural and recyclable raw materials can be used. In addition, the absence of the meltblown layer and the presence of a structure in the form of SS (Spunbond-Spunbond) provides an advantage in terms of recyclability. The process of the invention is an environmentally friendly process that allows less plastic use and less energy consumption compared to the state of the art.

The following figures will be used to better understand the multi-layer nonwoven interlining of the invention and the production process thereof.

Figure 1:
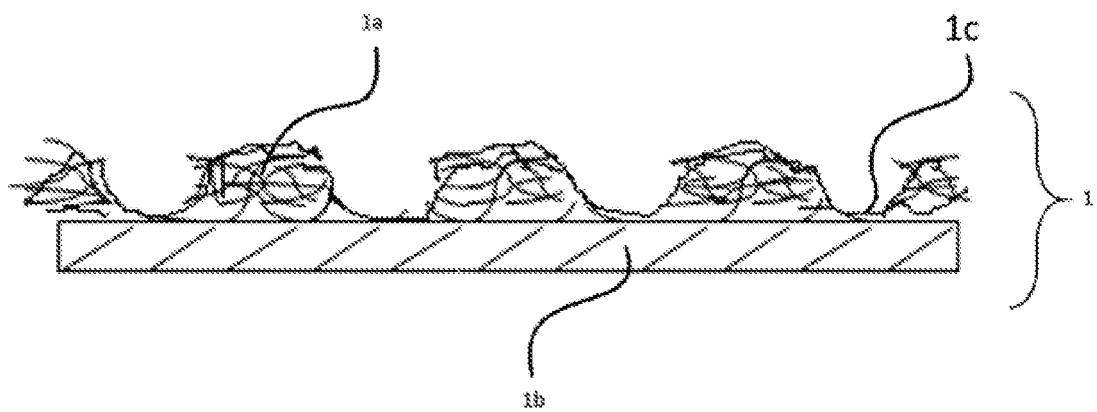
FIG. 1 is the view showing the layers of the multi-layer nonwoven interlining of the invention.

REFERENCE NUMERALS OF THE SECTIONS, PARTS AND FLOW CHART TO SERVE FOR DESCRIBING THE INVENTION

1—Point-bonded multi-layer nonwoven interlining
  1a—Carded web
  1b—Additional layer
  1c—Point bonding area
2—Production assembly
  2a—Fiber opening chamber
  2b—Picker, mixer cylinders
  2c—Fiber warehouse
  2d—Feeding unit
  2e—Conveyor belt
  2f—Feeding cylinder
  2g—Weighing conveyor belt
  2h—Cylinder
  2i—Drum
  2j—Embossing calender
  2k—Smooth calender
  2l—Additional layer opener
  2m—Thermal treatment unit
  2n—Winder Process Flow Chart to Serve for Describing the Invention 100—Fiber opening step
110—Fiber feeding step
120—Carding step
130—Levelling step of the additional layer by the thermal treatment
140—point bonding step of the carded web and additional layer

DETAILED DESCRIPTION OF THE INVENTION

With the production process of the multi-layer nonwoven interlining of the invention, it is the object to carry out the production, in which the layers produced with the hot embossing calender in the state of the art are combined with a second process, with a single process on a single production line simultaneously. Based on this basic object, the fibers are subjected to the fiber opening, fiber feeding and carding treatments and the carded web (1a) is obtained, and by the point bonding method, the said carded web (1a) is joined with an additional layer (1b) levelled by means of the thermal treatment.

Figure 2:
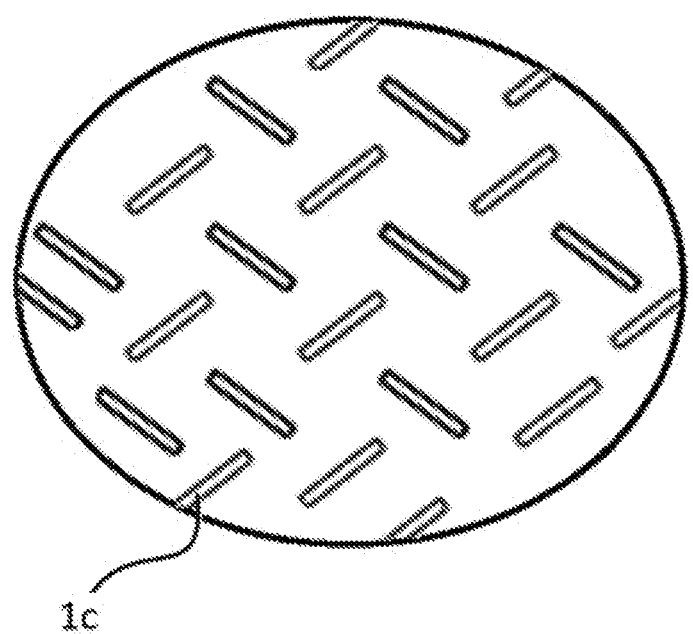
FIG. 2 is the view of the top surface of multi-layer nonwoven interlining of the invention.

As a result of the process of the invention, a point-bonded multi-layer nonwoven interlining (1) is obtained as in FIG. 1. As can be seen in FIG. 1, the point-bonded multi-layer nonwoven interlining (1) of the invention comprises at least two layers, at least one carded web (1a) and at least one additional layer (1b). Said carded web (1a) and additional layer (1b) are joined from the parts shown as the point bonding area (1c). The view of the top surface of point-bonded multi-layer nonwoven interlining obtained as a result of the process of the invention is given in FIG. 2. The traces of the embossing calender (2j) in the form of the crossbars are seen in FIG. 2, these parts show the thermal-bonded melted areas of the fiber after passing through the calender and are the point bonding areas (1c).

Figure 3:
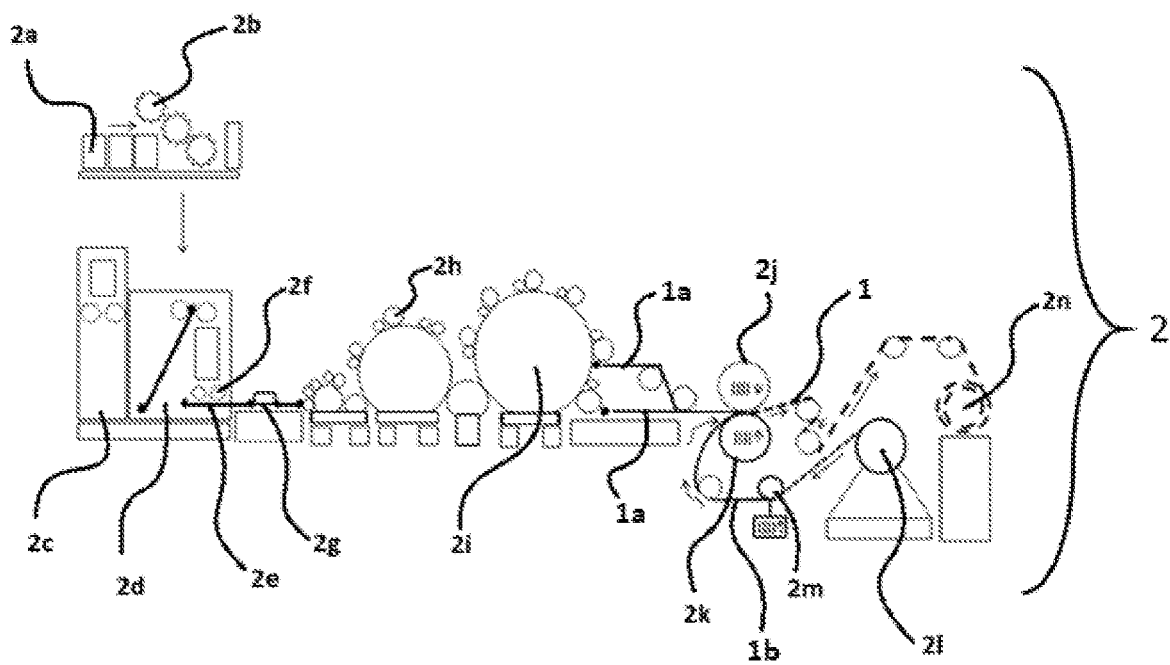
FIG. 3 is the representative view in which the production assembly is schematized with the process of the invention.
Figure 4:
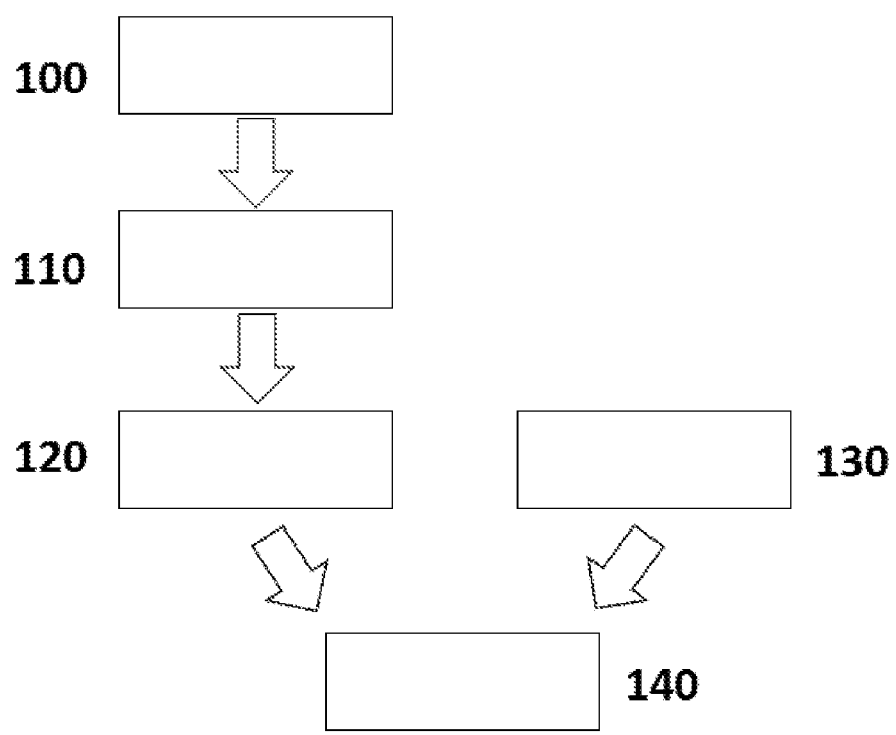
FIG. 4 is the flow chart showing the treatment steps of the process of the invention.

The production process of the multi-layer nonwoven interlining of the invention is generally carried out in a representative production assembly (2) as in FIG. 3. It should be appreciated that the image is representative, and the process can be carried out manually or with the different equipment that will perform the same function; in this respect, the expressions such as machine and unit in the descriptions and images should not be binding. The treatment steps of the production process of the multi-layer nonwoven interlining of the invention form a flow diagram as in FIG. 4. The process of the invention generally comprises the following treatment steps;
  the fiber opening step (100)
  the fiber feeding step (110)
  the carding step (120)
  the levelling step of the additional layer by the thermal treatment (130)

the point bonding step of the carded web and additional layer (140)

Generally, in the production process of the multi-layer nonwoven interlining of the invention, the carded web (1a) including of different fiber types and mixtures and the additional layer (1b) preferably obtained by using any of the thermobond, spunbond, spunlace techniques are joined by the point bonding process. Accordingly, the carded web (1a) is firstly produced, and then the additional layer (1b) is levelled by the thermal treatment in a separate area.

The additional layer (1b) is a layer previously produced by the different techniques, and the manufacturing process of the additional layer (1b) will not be explained separately. It should be known that the additional layer (1b) is formed by the methods in the state of the art. As a result of obtaining the carded web (1a) and levelling the additional layer (1b) by the thermal treatment, said carded web (1a) and the additional layer (1b) are joined by point bonding and the point-bonded multi-layer nonwoven interlining (1) is obtained. The detailed explanations of the treatment steps constituting the process of the invention are as follows.

Fiber Opening Step (100)

In this step, any of the staple, synthetic, regenerated and natural fibers or any of the bicomponent and synthetic fibers with the different cross-sectional structures are subjected to the pre-opening, preferably mechanically, in the fiber opening chamber (2a) in the form of a single or quadruple blend, at the rates in the range of 1-100%. Thereafter, they are transferred to the fiber warehouse (2c) by means of the picker, mixer cylinders (2b)

Fiber Feeding Step (110)

In this step, the fibers that are opened and arrive the fiber warehouse (2c) arrive the feeding unit (2d). In the feeding unit (2d), the fibers of different types and structures are mixed by being aerated in the desired blend. The fibers are transferred to the feeding cylinders (2f) via the conveyor belt (2e) and then are laid on the weighing conveyor belt (2g) and the next step, the carding step (120), is proceeded.

Carding Step (120)

In this step, the fiber mixtures in the weight range of 8 g/m²-100 g/m² are transported preferably through the weighing conveyor belt (2g). Said fiber mixtures are laid randomly by opening them at ±45° in parallel and diagonal directions in a system consisting of the cylinders (2h) and drums (2i) with different diameters, different speeds, different directions, and different technical equipment and are directed to the belt system with a different number of the transfer drums (2i). In this step, the carded web (1a) is obtained.

The equipment properties of the cylinders (2h) such as the structure-inclination, placement of said equipment, the revolutions of the cylinders that will perform the carding process may vary depending on the variables such as raw material fiber mixture, fiber denier-length values, fiber morphological structure. The fiber properties should preferably be in the ranges of 0, 5-15 denier and 30-80 mm in length. The fibers can be any of the mono or bicomponent synthetic fibers of polyester, polyamide, polypropylene, etc., any of synthetic fibers with different cross-section structures such as round-hollow-trilobal, etc., natural and regenerated fibers such as viscose, cotton, etc. The selection, mixing, and mixing ratios of these fibers are decisive in the parameters of the equipment properties of the cylinders (2h).

Levelling Step of the Additional Layer by the Thermal Treatment (130)

In this step, the additional layer (1b) is opened via the additional layer opener (2l), and the opened web is thermally treated in the thermal treatment unit (2m). The thermal treated additional layer (1b) is directed to the smooth calender (2k) for the next step.

The additional layer (1b) is preferably a web obtained by means of one of the thermobond, spunbond, spunlace techniques. The additional layer (1b) that contacts the hot cylinder by an ironing-like process gains a levelled surface and performance increase due to the temperature.

The fiber content of the web to be used as an additional layer, the physical and chemical properties of the fibers (for example, the technical properties such as the degree of softening, the weight of the web, the desired strength in the target product, air permeability, touching) are the primary factors that will determine the levelling parameters by the thermal treatment. The secondary factors are the fiber content of the carded web (1a) to be point-bonded with the additional layer (1a), the physical and chemical properties of the fibers and the speed of this described simultaneous process.

Point Bonding Step of the Carded Web and Additional Layer (140)

In this step, the additional layer (1b) obtained as a result of the levelling step of the additional layer by the thermal treatment (130) and the carded web (1b) obtained as a result of the carding step (120) are transmitted between the internal oil heated calenders. They are passed between the hot smooth calender (2k) and the hot embossing calender (2j) at the temperature, pressure and speed values suitable for fiber mixture. The additional layer (1b) and the carded web (1a) are calendered by heat and pressure, joined by the thermal welding points in the hot embossing calender (2j) and wound by the winder (2n). In this step, the parameters may vary depending on the type and weight of raw materials and additional layer (1b). The temperature values should preferably be in the range of 50-500° C. The temperature difference between the smooth calender (2k) and the embossing calender (2l) is preferably ±20° C. The thermal bonding area of the embossing calender (2j) is preferably in the range of 5-40% mm².

As a result of the treatment steps described above in detail, the point-bonded multi-layer nonwoven interlining (1) is obtained. The point-bonded multi-layer nonwoven interlining (1) of the invention comprises at least one additional layer (1b) and at least one carded web (1a) disposed on said additional layer (1b). Said additional layer (1b) is preferably a layer formed by one of the thermobond, spunbond, spunlace techniques and subjected to levelling by the thermal treatment. The carded web (1a) is a web obtained from the fibers of different type and structure such as any of the staple, synthetic, regenerated and natural fibers or any of the bicomponent and synthetic fibers with the different cross-sectional structures. Said additional layer (1b) and carded web (1a) are joined by the point bonding.

INDUSTRIAL APPLICABILITY OF THE INVENTION

The point-bonded multi-layer nonwoven interlining of the invention is a product which is used in the hook and loop fasteners and can be used in many areas where needed. It can be used in the protective clothing and in the parts that need joining, closure, holding, integration and support. It is possible to use in the disposable or reusable sleeves of the sphygmomanometers suitable for sterilization and on the front bands of the baby diapers. Apart from the hygiene and medical products, it is an air-permeable, compatible, economical and functional option for outdoor wear and shoes, in the technical and industrial uses.

The invention claimed is:

1. A production process for a multi-layer nonwoven interlining, the process comprising:
    pre-opening fibers in a fiber opening chamber in a single or quadruple blend;
    feeding the pre-opening fibers in a feeding unit so as to mix the fed fibers by aeration;
    carding the fed fibers by laying the fed fibers randomly by opening the fed fibers at ±45° in parallel and diagonal directions so as to obtain a carded web;
    leveling an additional layer by thermal treatment, the leveled additional layer being an opened web; and
    point bonding the carded web and the opened web by calendaring with heat and pressure so as to be joined by thermal welding point so as to obtain the multi-layer non-woven interlining.

2. The production process of claim 1, wherein the pre-opening fibers are selected from a group consisting of staple fibers, synthetic fibers, regenerated fibers and natural fibers, the pre-opening fibers have different cross-sectional structures.

3. The production process of claim 1, further comprising:
    transferring the pre-opened fibers to a fiber warehouse by a picker cylinder.

4. The production process of claim 1, further comprising:
    transferring the fed fibers to feeding cylinders via a conveyor belt; and
    laying the transferred fed fibers onto the conveyor belt prior to the step of carding.

5. The production process of claim 1, wherein the step of carding is in a system of cylinders and drums, the production further comprising:
    directing the laid fed fibers to a belt system having transfer drums so as to obtain the carded web.

6. The production process of claim 1, wherein the fed fibers are of 0.5-15 deniers and a length of between 30 millimeters and 80 millimeters.

7. The production process of claim 1, further comprising:
    directing the leveled additional layer to a smooth calendar.

8. The production process of claim 1, wherein the opened web is selected from a group consisting of a thermobond web, spunbond web and a spunlace web.

9. The production process of claim 1, wherein the step of point bonding comprising:
    passing the carded web and the opened web between internal oil-heated calendars; and
    passing the passed carded web and the opened web between a smooth calendar and an embossing calendar.

10. The production process of claim 9, wherein the heat of the step of point bonding is between 50° C. and 500° C., the smooth calendar and the embossing calendar having a respective temperature difference of 20° C., the embossing calendar having a thermal bonding area of between 5 square millimeters and 40 square millimeters.

* * * * *